Nov. 4, 1924.
1,514,470
P. S. SMITH
APPARATUS FOR COATING AND DRYING FABRICS
Filed March 29, 1920
8 Sheets-Sheet 1

Inventor,
Paul S. Smith
by
T. T. Greenwood
atty

Nov. 4, 1924.                                                           1,514,470
                              P. S. SMITH
                 APPARATUS FOR COATING AND DRYING FABRICS
                    Filed March 29, 1920    8 Sheets-Sheet 2

Inventor,
Paul S. Smith
by
T. T. Greenwood
atty

Nov. 4, 1924.
P. S. SMITH
APPARATUS FOR COATING AND DRYING FABRICS
Filed March 29, 1920   8 Sheets-Sheet 7

Inventor,
Paul S. Smith
by
[signature] atty

Patented Nov. 4, 1924.

1,514,470

UNITED STATES PATENT OFFICE.

PAUL S. SMITH, OF WEST BARRINGTON, RHODE ISLAND, ASSIGNOR, BY MESNE ASSIGNMENTS, TO O'BANNON COMPANY, OF WEST BARRINGTON, RHODE ISLAND, A CORPORATION OF MASSACHUSETTS.

APPARATUS FOR COATING AND DRYING FABRICS.

Application filed March 29, 1920. Serial No. 369,823.

*To all whom it may concern:*

Be it known that I, PAUL S. SMITH, a citizen of the United States, residing at West Barrington, in the county of Bristol and State of Rhode Island, have invented an Improvement in Apparatus for Coating and Drying Fabrics, of which the following is a specification.

This invention relates to an apparatus for coating and drying fabrics, and other material in the web and recovering the solvents therefrom, and is particularly adapted for the coating of cloth for the manufacture of the product technically called artificial leather.

My invention relates particularly to a drying chamber and associated coating device and conveying mechanism so constructed that an endless section of the web to be coated many times longer than the drying chamber may be passed under the coating device and through the drying chamber continuously and without interruption any desired number of times, and by providing an apparatus for the recovery of the coating solvent in series relation with, but external to, the drying chamber, whereby the air laden with the solvent may be taken from the drying chamber and passed through condensing and extracting apparatus by which the solvent is, so far as possible, eliminated and recovered. The air from which the solvent has been condensed may then be returned to the drying chamber after being heated by the warm solvent laden air through the medium of an exchange heat apparatus, if desired.

My invention includes drawing means to draw the web into and along the drying chamber at a predetermined rate of speed and conveying means, arranged beneath the drawing means and either within or without the drying chamber, as desired, to receive upon it the web as it leaves the drawing means, said conveying means moving at a much slower rate of speed than the drawing means, whereby the web received from the drawing means is laid on the conveyer in folds or loops, and is moved along in such form to the guiding and supporting means, by which it is carried to the coating device for another coating or rolled up when the coating operation has been completed.

Certain features of this invention are disclosed and claimed in my copending application Serial No. 384,228, filed May 25, 1920.

In the drying apparatus here shown for illustrating one embodiment of my invention, the web 20, to be coated in the form of a roll, is arranged on a horizontal shaft 21, which is set in and loosely supported by brackets 22, arranged upon upright standards 23 of the machine, and said shaft may have a brake-pulley 24 at one end which is supplied with a suitable brake 25 by which any desired amount of friction may be applied to regulate the tension of the web as it is drawn from the roll. The end portion of the web 20 is drawn from the roll, as represented by dotted lines in Fig. 1, and is first carried by hand and subsequently by means to be described, over horizontally arranged idle rolls 26 and 27, which are constructed and supported in any suitable manner, and brought into engagement with a doctor of any usual or suitable construction, or other form of coating device by which the coating substance is applied to its surface, and then carried over a horizontal idle guiding and supporting roll 28, which is arranged at the entrance to the drying chamber just below the entrance slot 29, and then carried into and through said drying chamber, and through the exit slot 30, and then carried over horizontally arranged idle rolls 32, 33 and 34, and over a horizontally arranged tension roll 35, and over horizontally arranged idle rolls 36 and 37.

The long portion thus drawn from the supply, which may be a whole roll or a portion thereof, is thus arranged in the machine, and then its end portions are attached together by stitches or other fastenings, thereby to form a long endless section of the web, which, in addition to the aforesaid arrangement thereof in the machine, also passes from the idle roll 37 to the idle roll 26. The doctor here shown, see Fig. 7, consists of a blade 38, arranged horizontally and extended transversely the web, and usually beyond the side edges thereof, said blade being arranged obliquely and supported below the top of the roll 27, thereby to deflect the web so as to form in conjunction with an adjacent portion of the web, a V-shaped trough to receive the coating substance. Said blade is supported at its ends by boxes 40 which are arranged for vertical adjustment, as, for instance, by the hand screws 41, which are connected with them. Below the doctor and at each end thereof, hollow receptacles 42 are arranged to catch the drippings from the open ends of the trough formed by the blade and web.

The drying chamber shown in Figs. 1–5 inclusive is approximately U-shaped in form and is arranged to comprise two elongated portions a and b one above the other, which are in open connection with each other at one end by the end portion c. Said chamber is composed of channel bars and angle bars which are bolted or otherwise secured together to form a skeleton structure and walls of non-flammable, impervious fabric applied tightly to said bars and held by strips of wood or other suitable means. It will be noted that the arm a is downwardly inclined from the coating end to the turning point, a form which possesses advantages and is preferred but is not essential. Said chamber is suitably closed and has doors arranged at suitable places by which access may be had thereto. The entrance slot 29 is located at the end of the front portion a, and the exit slot 30 is located at the end of the lower portion b. In the upper portion numerous supporting rolls 44 are arranged over which the web passes and by which it is supported. In the end portion c a drawing roll 45 of large diameter is arranged, which is secured to a horizontal shaft 46 extended through the walls of the chamber at both ends. To one of the projecting ends of said shaft a gear wheel 47 is secured which is engaged by a pinion 48 secured to a horizontal shaft 49 to which a driving pulley 50 is secured and by which said shaft and the drawing roll borne by it are positively rotated. The web passes from said drawing roll 45, to and over a horizontally arranged roll 51, also arranged in the end portion c of the drying chamber, and said roll 51 is positively driven, and, as here shown, has secured to its shaft a gear wheel 52, which is engaged by an intermediate gear wheel 53 which is in turn engaged by an intermediate gear wheel 54 which is engaged by a gear wheel 55 secured to the positively driven shaft 46.

A horizontally arranged presser roll 56 is loosely supported upon the roll 51, which holds the web in engagement with said roll 51. The gearing connecting the shaft of the roll 51 with the positively driven shaft 46 is such that the peripheral speed of the roll 51 is slightly greater than that of the drawing roll 45, whereby the web is held tightly and is prevented from slipping on said drawing roll and thereby assists the drawing roll in imparting a positive motion to the web, and therefore serves as a supplemental drawing roll. The web then passes to a conveyor by which it is conveyed back for the new coating in the lower portion of the drying chamber or entirely outside the same, as shown in the modification in Fig. 8.

The conveyor here shown consists of a plurality of long endless belts arranged in a horizontal plane and extended from the outer end of the end portion c to a point beyond the end of the lower portion b of the drying chamber, the intent being to make the belt as long as possible. Said belts, at one end, pass over a set of positively driven pulleys 60, secured to a horizontal shaft 61, arranged at the bottom of the end portion c near the outer end thereof, and said belts at the other end pass over idle pulleys 62 secured to a horizontal shaft 63 arranged in front of the end of the lower portion b. The shaft 61 has secured to it a worm wheel 64, which is engaged and driven by a worm 65 secured to a vertical shaft 66, having a bevel gear 67 at its upper end, which engages a bevel gear 68 secured to the positively driven shaft 46. The gears thus employed for driving the belts are such that movement of the belts is very slow as compared with peripheral movement of the drawing roll 45 and, as a result, the web, which falls by gravity from the roll 51 upon the conveyor, is caused to form thereon in effective condenser in connection with a spray collector the air passing through the recovery apparatus is very nearly freed of vapor and is dryer than ordinary atmospheric air, which I find a desirable condition for my purpose.

The condenser has cold water pipes, 95, 96, connected with it and also a drip pipe 97, by which the recovered solvent may be drawn off.

The heating apparatus will contain any number and arrangement of steam pipes.

Within the drying chamber pipes for heating, are also arranged, as for instance, in the upper and lower portions thereof a set of pipes 100 and 101 may extend throughout the length thereof, which pipes will be connected with any suitable heating supply.

I prefer, however, to use steam for heating the lower chamber and hot water for the upper chambers, as hot water is much more susceptible to accurate heat control and is capable of giving lower temperatures than steam, which is a matter of importance.

Instead of passing the air back again to the drying chamber it may be discharged into the open air, and fresh air drawn into the drying chamber.

The arrangement shown in Figs. 9 to 15 inclusive is the preferred form of my invention and has many advantages. The drying chamber is divided by partitions to form four different passages 110, 111, 112, 113, on different levels, with connecting passages 114, 115, 116, through which the web passes under tension from the upper to the next lower passage around a guide roll until the solvent has substantially evaporated.

The drying medium passes in the contrary direction preferably first to the lower chamber and then contrary to the movement of the web to the upper chambers. After the drying medium has passed to the top compartment of the drying chamber, it passes out of the drying chamber at a point near the entrance of the web and thence through condensing apparatus for the recovery of the solvent, as in the other forms here shown. For the manufacture of artificial leather, a purpose for which this apparatus is particularly well adapted, I prefer to have this condensation as perfect as possible. With a proper condenser, the air will be more than normally dry when it leaves the condenser.

The lower compartment 113 of the drying chamber forms what may be termed a fold or festoon chamber in which the coated and partially dried web, as it passes from the upper compartments is arranged in folds or festoons on a conveyor and carried to the exit from the drying chamber. Heating coils 117 are placed in said chamber and are adapted to heat the air supplied to the chamber to any safe temperature. Inasmuch as the coating of the web in said chamber is comparatively dry, the air may be raised to a comparatively high temperature without injury to the coating.

Heating coils 118 are placed at the top of the compartment 112 to heat the air therein to a suitable temperature. As the coating on the web as it passes through said compartment is not so dry as that in the festoon chamber it is not desirable to raise the temperature of the air to so high a degree.

The upper wall 119 of said compartment 112 forms the lower wall of compartment 111 and is made of metal or other good conductor. Accordingly said compartment 111, owing to the close proximity of the heating coils 118 in the lower compartment, receives a considerable amount of heat, but preferably less than that of compartment 112. As the coating is more delicate in compartment 111, owing to the greater amount of solvent there, this diminution of heat is advantageous. The upper compartment 110 I usually have free from artificial heating means, as the coating at this point contains a large quantity of solvent and is liable to injury from an excessive temperature.

Nevertheless, the air in this upper chamber should not be allowed to become so cold as to interfere with the process of evaporation, and in case the evaporation cools the air in this upper chamber unduly, a moderate heat should be supplied by any suitable means, as steam or hot water coils, not shown, to maintain the drying medium at a normal temperature, which, however, should be materially below what is possible in the chambers below.

It will be noted that in the festoon chamber 113 the air is substantially free from moisture, and, the temperature being high, the maximum drying effect is obtained, thus tending to remove the last traces of the solvent. In compartment 112 the air is not so warm and contains some solvent in solution, but, on the other hand, the coating may contain an appreciable amount of solvent so there is still a substantial evaporating effect. In compartment 111 the air is yet cooler and contains more moisture but, as the coating contains a comparatively great amount of solvent, the drying medium is still able to absorb a considerable amount of solvent. In the top compartment 110 the air is the coolest but as the coating contains the maximum amount of solvent, even the comparatively cool and partially saturated air can absorb a satisfactory amount of solvent.

Figures 1, 6, 7:
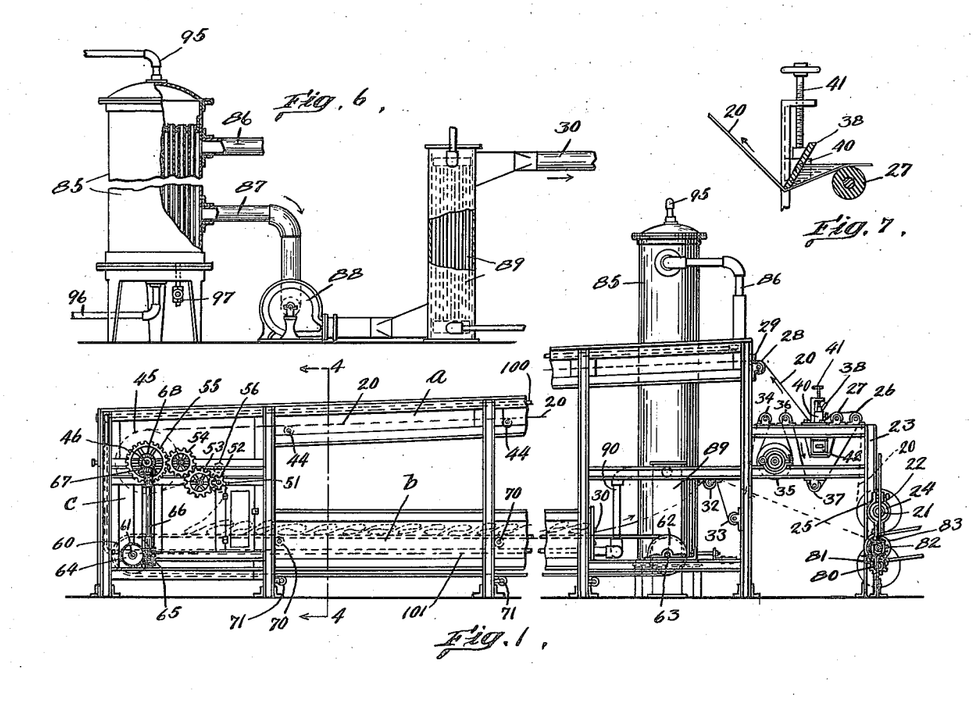
Fig. 1 is a side elevation of the coating and drying apparatus, a portion thereof being broken away to save space on the drawing.
Fig. 6 is an elevation, partly in section, of the condensing apparatus.
Fig. 7 is a detail of the coating spreading means.
Figure 2:
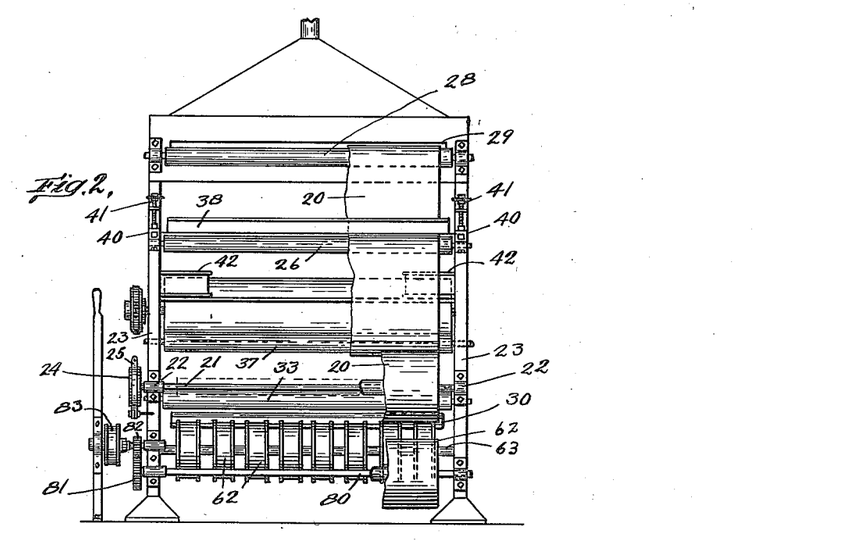
Fig. 2 is a right hand end elevation of the drying chamber on an enlarged scale.
Figure 3:
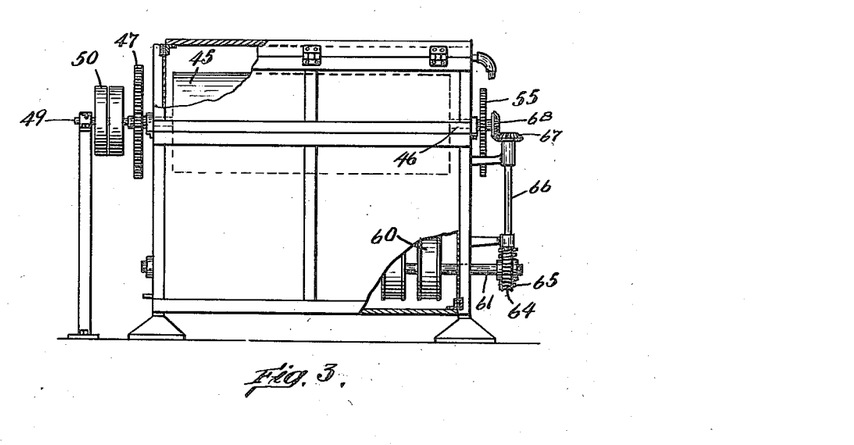
Fig. 3 is a left hand end elevation of the drying chamber on an enlarged scale.
Figure 4:
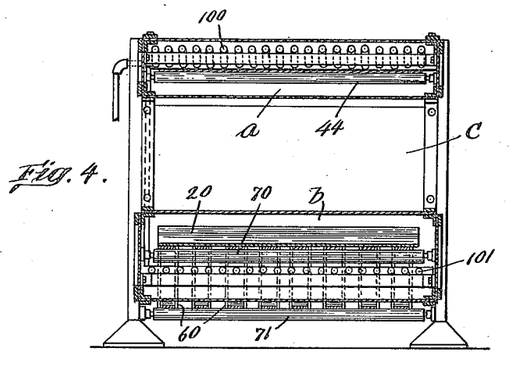
Fig. 4 is a sectional elevation on line 4—4 of Fig. 1.
Figure 5:
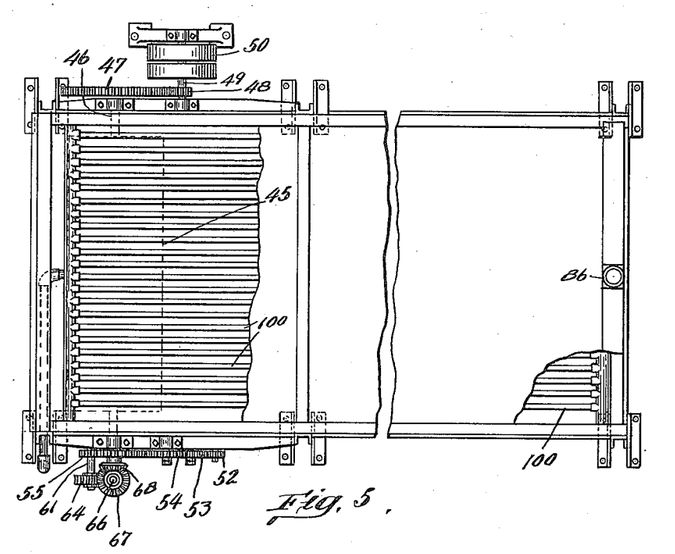
Fig. 5 is a plan view of the drying chamber of Fig. 1 partly broken away for purposes of illustration.

I prefer to make the top compartment 110 narrower than the compartments 111 and 112 with the result that the velocity of the air in this chamber is greater than in the lower chambers and the air is brought into closer contact with the material thus giving, folds, as indicated in Fig. 1. The movement of the conveying belts is constant, like that of the drawing roll, so that the folds are produced with regularity. The upper portion of the conveying belts between the end pulleys, is or may be supported by rolls 70, and the lower portion thereof is or may be supported by rolls 71. The upper portion of the belts extend through the exit slot 30, so that the web may be taken therefrom at such point. The lower portion of the belts may extend along beneath the lower portion b of the drying chamber, if desired, and is here shown thus arranged. The web is drawn from the conveyor over the idle rolls 32, 33 and 34 into engagement with the tension roll 35, and thence is drawn over the idle rolls 36, 37 and 26, 27, to the doctor, and so proceeds through the machine in an endless continuous manner. By providing the slowly moving conveyor, as here shown, it will be seen that a section of web many times the length of the drying chamber may be arranged in the drying chamber and may be carried along continuously and each time the section passes entirely beneath the doctor it is coated and each time it passes entirely through the drying chamber the coating thus applied is dried, and as many coats may be applied and subsequently dried as desired, the process being a continuous one.

When the section of the web has received upon it as many coats as desired, it will be removed from the machine and to accomplish this result the seam joining the ends of the section or the section itself may be severed, preferably immediately before passing under the doctor 38, the section of the web most remote from the doctor being removed successively from the rolls 27, 26, 37, 36, 35, and 34, and carried to a winding shaft 80.

Said winding shaft 80 is arranged to be positively driven for the purpose of winding the web on a roll arranged thereon, and, as here shown, a gear wheel 81 is secured to said shaft, which is engaged by a pinion 82, arranged on a stub shaft, and arranged for connection with a driving pulley 83, by means of a suitable clutch. Before starting to wind the severed section on the shaft 80, and thereby withdraw it from the machine, the end portion of the web from the supply roll on the shaft 21 is attached to the severed end of the section of the web adjacent to the doctor, so that while the severed section of the old roll is being drawn from the machine by the operation of the winding shaft another long section from the new roll is being drawn into the machine. When the uncoated web is entirely unwound from the supply roll on the shaft 21, the seam or fastening uniting the uncoated with the coated web is cut or broken, and that end of the uncoated web is passed successively around the rolls 32, 33, 34, 35, 36 and 37 is sewed or fastened to the other end of the uncoated web which has just been unwound from the supply roll, thereby forming a new endless section which it will be seen, is already arranged in the machine preparatory to being repeatedly coated and dried by a continuous operation as aforesaid. In case the seam uniting the ends of the coated and uncoated webs has not issued from the drying chamber when the uncoated web is completely unwound from the supply roll on the shaft 21, the driving roll 45 is stopped, and the operation of the winding shaft 80 is continued independently until the seam is brought to a readily accessible position, as it is immaterial in the subsequent operation of the machine whether or not the folded web occupies the entire length of the belt conveyor. Thus the machine is capable of handling without difficulty web much shorter than the full capacity of the conveyor.

Figure 8:
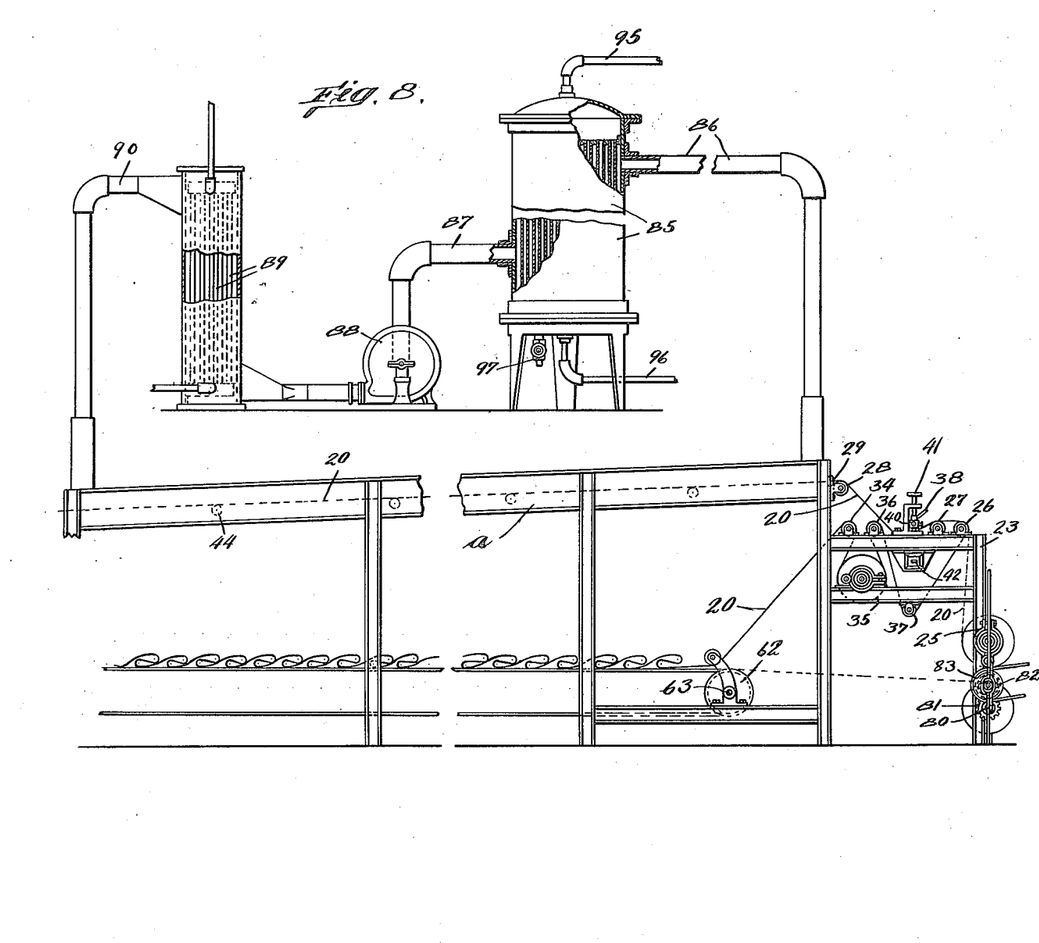
Fig. 8 is a modified form of coating and drying apparatus embodying my invention.
Figure 9:
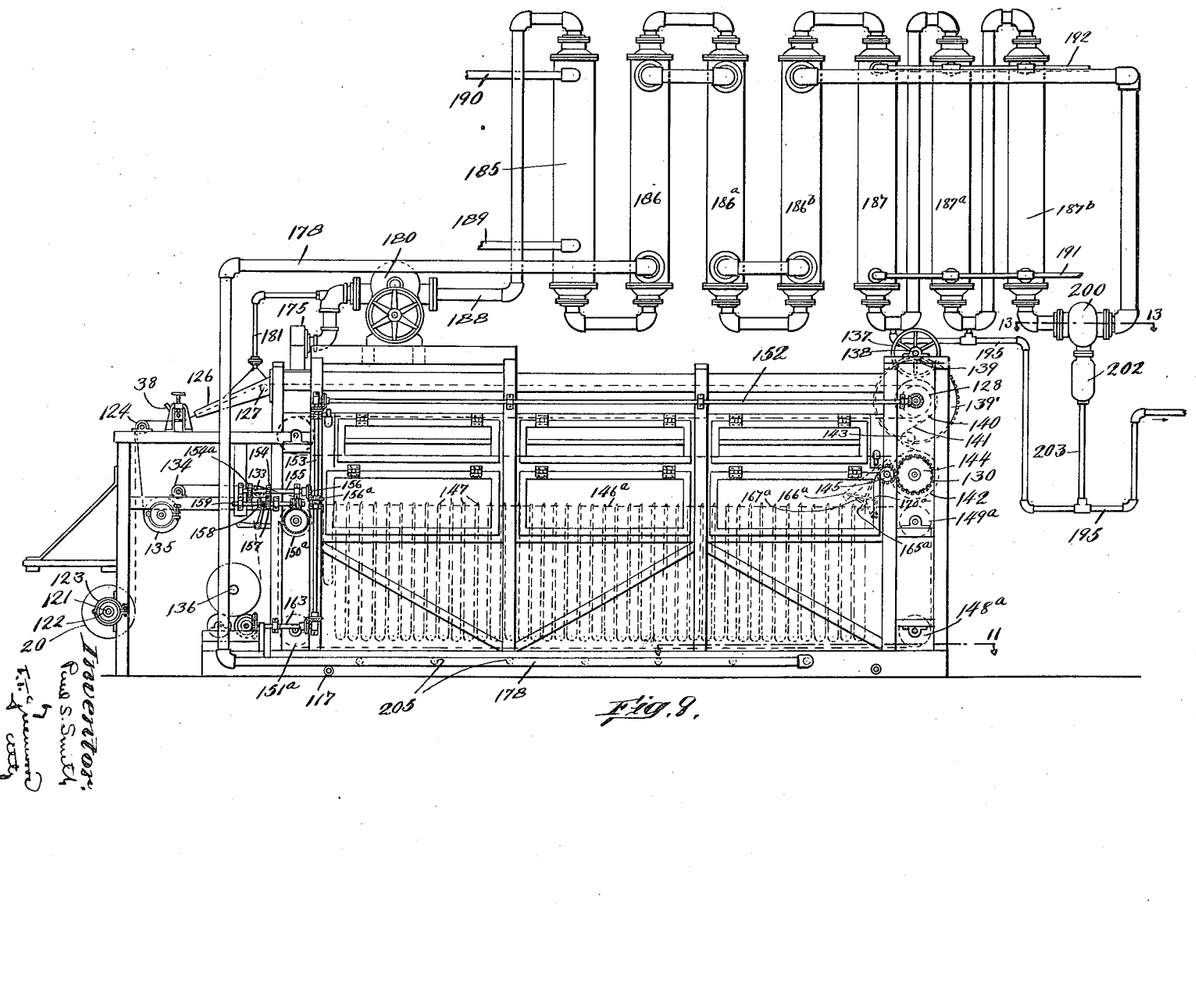
Fig. 9 is a further modified form of coating, drying and solvent condensing apparatus embodying my invention.
Figure 10:
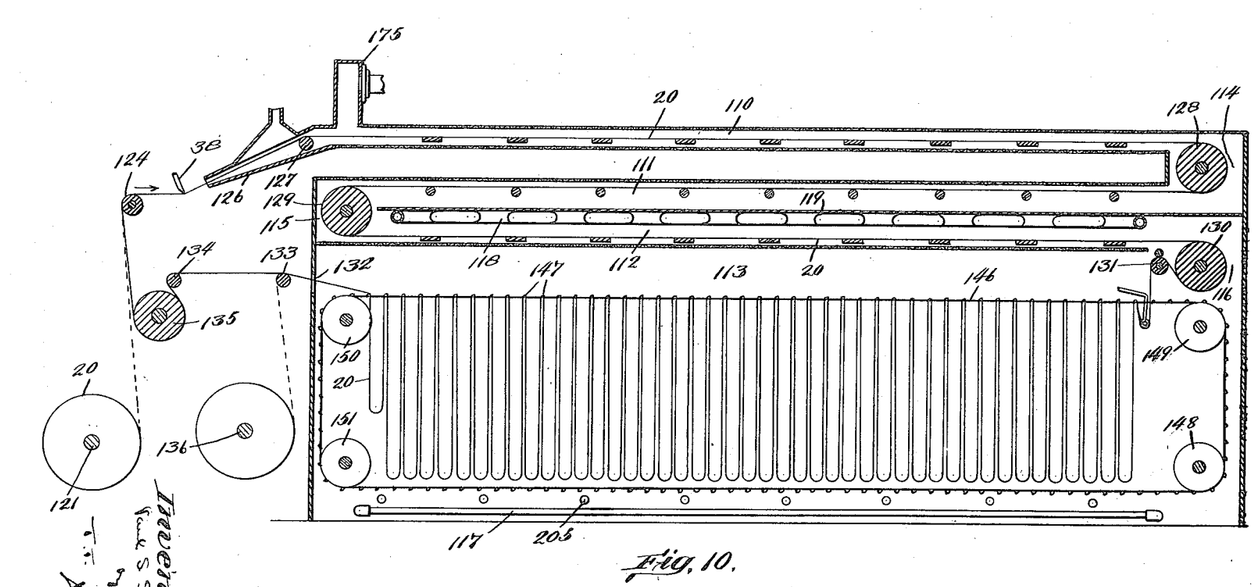
Fig. 10 is a diagrammatic sectional elevation of the coating and drying apparatus of Fig. 9.

Fig. 8 shows a structure in which the drying chamber surrounds only the portion of the traverse of the web in which it is under tension, the driving roll and the returning conveyor being arranged as illustrated in Fig. 1 and outside the drying chamber, but the apparatus is in other respects the same. In this case, the drying current enters the drying chamber at the lower end thereof, where the web leaves the drying chamber. As in the form shown in Figs. 1 to 7 of the drawings, the drying current flows in a direction contrary to the movement of the web.

For the recovery of the solvent which is contained in the coating substance I have provided a condenser 85, separate from the drying chamber, which may be of any well known or suitable construction, and a pipe 86 leads from the top of the drying chamber to said condenser through which the air, more or less saturated with the solvent passes to the condenser. A pipe 87 leads from said condenser to an exhauster 88, by which the air, after condensation of its solvent, is drawn from the condenser and delivered to a heating apparatus 89, and a pipe 90 leads from the top of said heating apparatus to the bottom of the drying chamber, as, for instance, it may be connected therewith at the end of the lower portion b thereof. Thus the condenser and heating apparatus are arranged serially in circuit with the drying chamber, and in connection therewith form a continuous circuit for the air, the same body of air being passed again and again through the drying chamber while the exhauster 88 serves as a means to promote a rapid circulation.

For the manufacture of artificial leather, a purpose for which this apparatus is particularly designed, I prefer to have the condensation as perfect as possible, and with an in that chamber, the greatest possible contact of the drying medium with the goods.

As with other forms of my apparatus here described, the web may be passed as a continuous loop a successive number of times through the apparatus to receive and dry a successive number of coatings thereon, or the web may be passed but once through the apparatus and, with a single coating thereon, formed in a roll.

As here shown, the web 20 in the form of a roll is arranged on a horizontal shaft 121 journalled in suitable bearings secured to the frame of the drying chamber. Said shaft is provided with a brake drum 122 which is adapted to be engaged by a brake band 123 to adjust the tension of the web as it is unwound from the roll.

The end portion of the web is drawn from the roll as represented by the dotted line and passed over the horizontal roll 124 and under the doctor 38 at which point the coating is applied. From the doctor the web is passed through the entrance slot or opening in the hood 126 of the drying chamber and over a roll 127 at the entrance to the first passage or compartment 110 of the drying chamber.

The coated web is extended under tension through said compartment and passed over an upper driving roll 128 disposed in the connecting passage 114 between the upper compartment 110 and the next lower compartment 111 and extended through said lower compartment and passed around a guide roll 129 disposed in the connecting passage 115 between said compartment 111 and the next lower compartment 112. After leaving said guide roll 129 the web is extended under tension through said compartment 112 and passed over the lower driving roll 130 disposed in the passage 116 connecting said compartment 112 with the festoon chamber 113. From said driving roll 130 the web is passed around a nip roll 131 disposed in said compartment 113 from which it falls by gravity onto a conveyor arranged in said compartment and by which it is carried to the exit from the drying chamber.

After passing through the exit slot 132 in the drying chamber the web is extended over the guide rolls 133 and 134 and around the tension drum 135 and over the roll 124 to the doctor to receive another coating. After the web has received a sufficient number of coatings the ends of the web may be separated, preferably between the rolls 133 and 134, and formed in a roll on the shaft 136.

The power for driving the various rolls to move the web through the machine is applied at a pulley 137 fixed to a shaft 138 conveniently disposed at the top of the drying chamber. A gear 139 secured to said shaft is in mesh with a gear 139' fixed to the shaft carrying the upper web driving roll 128 and serves to drive said roll at such speed as to cause the most effective movement of the web through the drying chamber.

The shaft carrying roll 128 is also provided with a pulley 140, and a belt 141 is passed over said pulley and a pulley 142 of slightly smaller diameter secured to the shaft bearing the lower web driving roll 130 whereby the lower drying roll maintains a suitable tension on the web. A belt tightener 143 is or may be arranged in contact with said belt to maintain it in proper driving contact with the pulleys.

The roll 131, over which the web passes from roll 130, is driven from the shaft bearing the roll 130 by the meshing gears 144 and 145. Said roll 131 is adapted to be driven at a slightly greater peripheral speed than the web driving rolls to aid in keeping a taut web extended through the upper drying compartments.

From roll 131 the web falls by its weight onto a conveyor where it is arranged in festoons thereon and conveyed to the exit end of the drying chamber.

The conveyor includes two spaced-apart endless chains 146 and 146$^a$ connected at regular intervals by the cross-bars 147 on which the loops of web are adapted to be hung. Said chains are arranged over sprockets 148 and 148$^a$, 149 and 149$^a$, 150 and 150$^a$, 151 and 151$^a$ disposed at the corners of the festoon chamber 113.

The conveyor is driven by the sprockets 150 and 150$^a$ which are driven from the shaft bearing the roll 128 through the horizontal shaft 159 and vertical shaft 153 which are operably connected through gears with said roll shaft.

Change speed gearing is interposed between the shaft 153 and the sprockets 150 and 150$^a$ whereby more than a single speed of the conveyor may be obtained, whereby different lengths of coated web may be made to occupy substantially the entire length of the chamber.

As here shown, gears 154 and 154$^a$ of said gearing are fixed to a shaft 155 driven through bevel gears 156 and 156$^a$ from the vertical shaft 153. Other gears 157 and 158 of said change speed gearing are fixed together or are integrally formed and are slidably arranged on a shaft 159 which is connected through a worm 160 and gear 161 to the shaft carrying sprockets 150 and 150$^a$. A pivoted handle 162 is provided which is in engagement with said sliding gears 157 and 158 to cause said gear 157 to engage with the gear 153, or gear 158 to engage with gear 154, and said pairs of gears are arranged to drive said shaft 159 at differing speeds to correspondingly drive the conveyor at differing speeds.

Said vertical shaft is extended downward beyond its connection with the change speed shaft 155 and, at its lower end, is connected with a shaft 163 through which the roll of web is driven and wound on shaft 136.

As the web passes from the roll 131 it is arranged to fall downward and pass between the cross-bars 147 of the conveyor and, as the conveyor is at the same time moved forward, to form festoons on said cross-bars.

In order that the loops may be more effectively and positively formed, means are provided for definitely folding the web over the cross-bars as they are successively moved under the roll 131.

Figure 14:
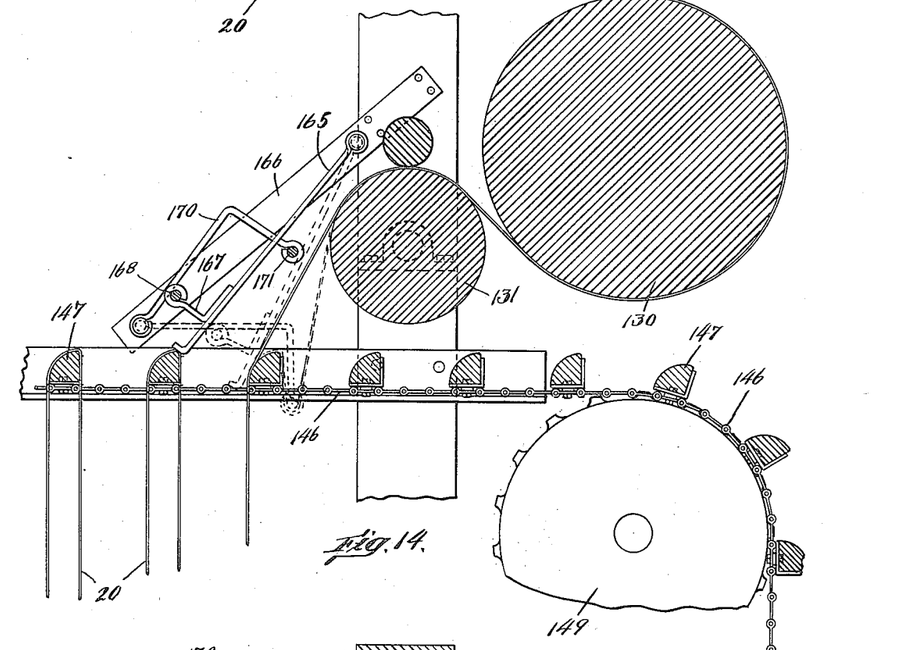
Figs. 14 and 15 are details in elevation and plan, respectively, of loop forming mechanism of Fig. 9.
Figure 15:
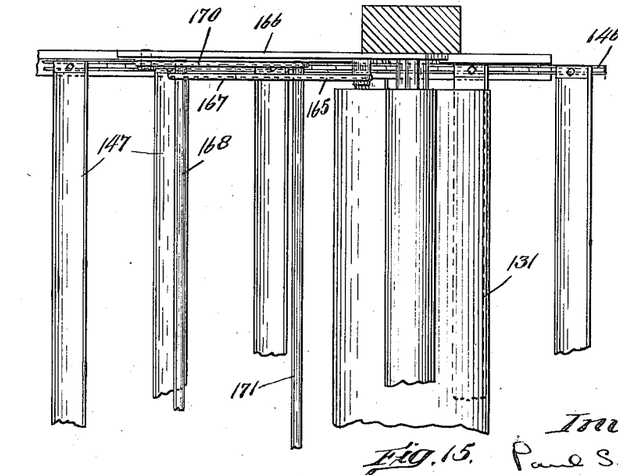

The festoon forming means includes rods 165 and 165ª which are pivoted to beams 166 and 166ª arranged at the sides of the conveyor and secured to component parts of the drying chamber. Said rods extend downward into the path of movement of the cross-bars of the conveyor and are adapted to be moved upward by the individual bars as they pass under said rods and to permit said rods to drop by gravity as they pass from under the rods.

Said rods are provided, near their free ends, with outwardly extended members 167 and 167ª in the ends of which is arranged the cross-member 168 which extends above and across the conveyor and which is adapted to be brought into contact with the web to form the loops.

Other rods 170 and 170ª, bent into substantially right-angled shape, are pivoted to said beams 166 and 166ª at points adjacent to and above the conveyor, and a rod 171 is extended between and connected to the free ends thereof.

As the ends of rods 165 and 165ª are moved upward by each cross-bar 147 as it passes underneath, the cross-rod 168 connected to said rods engages the rods 170 and moves them upward thereby also moving upward the rod 171 connected to the ends thereof. When the cross-bars pass from under said rods 165 and 165ª the rods rapidly drop by gravity and consequently permit the rods 170 and 170ª bearing the cross-rod 171 to drop. As said rod 171 falls it strikes against the web which passes in a more or less downwardly slanting direction from the roll 131 to a cross bar 147 in the rear of the one employed in raising the rods 165 and 165ª, and by its weight and momentum bends or folds the web over said cross-bar and so initiates the formation of a festoon between said cross-bar and the next succeeding one. The same operation is repeated as each cross-bar passes under the rods 165 and 165ª.

A blower or compressor 180 of any suitable or desirable construction is employed to ensure a positive circulation of the drying medium through the drying chamber and the condensing system and the warm moist air is drawn from the top compartment 110 of the drying chamber through the conduit 175 into the intake end of the blower or compressor. A pipe 181 also leads from the hood 126 to the compressor intake to collect the vaporized solvent in the hood. From the blower or compressor the moist air is forced through the cooling and condensing apparatus.

Although I have shown the blower or compressor as connected between the drying chamber and the condensing apparatus, yet it may be otherwise connected and insure a positive circulation of drying medium and, for some purposes, another position than the one illustrated may be desirable.

I prefer to pass the warm air from the drying chamber through a heat exchanging device through which the air from which the solvent has been extracted is passed in the reverse direction before being returned to the drying chamber.

I also prefer to pass the air from which the solvent has been condensed and before it has been reheated through a mechanical separator which may have a series of baffle-plates or similar collecting devices as I have found that the air from the condenser contains a considerable amount of condensed solvent in the form of fine spray which, if not removed, would be returned to the drying chamber and render the returned air less effective as a drying and absorbing medium.

The condensing system includes a pre-cooler 185, heat exchangers 186, 186ª, 186ᵇ, and condensers 187, 187ª, 187ᵇ through which the air is successively forced through the pipe 188 from the blower 180. The pre-cooler, heat exchangers and condensers may be of any ordinary or suitable construction and as many units as are desirable may be employed.

In the pre-cooler 185 water is introduced at the bottom of the shell through the pipe 189 and flows upward in a direction contrary to the downward flow of moist air therethrough and leaves the shell by the pipe 190. In its passage therethrough the water absorbs some of the heat of the moist air and causes the air to become more nearly saturated with the absorbed solvent.

The somewhat cooled air passes from the pre-cooler successively through the heat exchangers 186, 186ª, 186ᵇ. The cold, dry air from the condensers is circulated through the shells of said heat exchangers in a direction contrary to the flow of moist air therethrough and serves to extract heat from said moist air and to become heated in itself and in its heated condition passes by the pipe 178 to the festoon compartment 113 of the drying chamber.

The moist air, as it leaves the heat exchangers, is cool and in a more or less saturated condition and enters the condensers 187, 187ª, 187ᵇ through which it successively passes. The condensers are maintained cold by means of a solution of brine or other suitable refrigerating medium supplied to the shell of the condensers through the pipe 191 and flowing from said condensers in a partially heated condition through the pipe 192, having extracted heat from the drying medium in its passage therethrough. The brine or other refrigerant may be cooled by any suitable means.

As the air passes through the condensing units it becomes successively cooler and the evaporated solvent absorbed therein becomes condensed and separates from the air and collects at the bottom of the condensing units or at the bend in the pipes serially connecting the units. Connections are made with the lower parts of the units and a pipe 195 for the recovery of the condensed solvent.

After passing from the last condensing unit 187ᵇ the major part of the absorbed solvent has been condensed and recovered yet the cold air contains a substantial amount of mechanically entrained solvent in the form of a fine spray.

Figure 13:
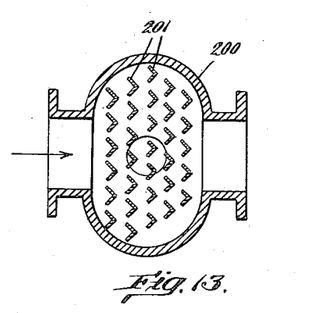
Fig. 13 is a sectional plan view of the solvent separator along lines 13—13 of Fig. 9.

A mechanical separator 200 is inserted in the pipe for the cooled air as it passes from the last condensing unit 187ᵇ to extract this remaining moisture. The separator is provided with a plurality of baffle-plates 201 or equivalent devices arranged in the path of flow of the cold air which serve to abstract the moisture from the air as it impinges thereon and to collect it in the receiver 202 from which it flows through the pipe 203 to the solvent pipe 195.

Figure 11:
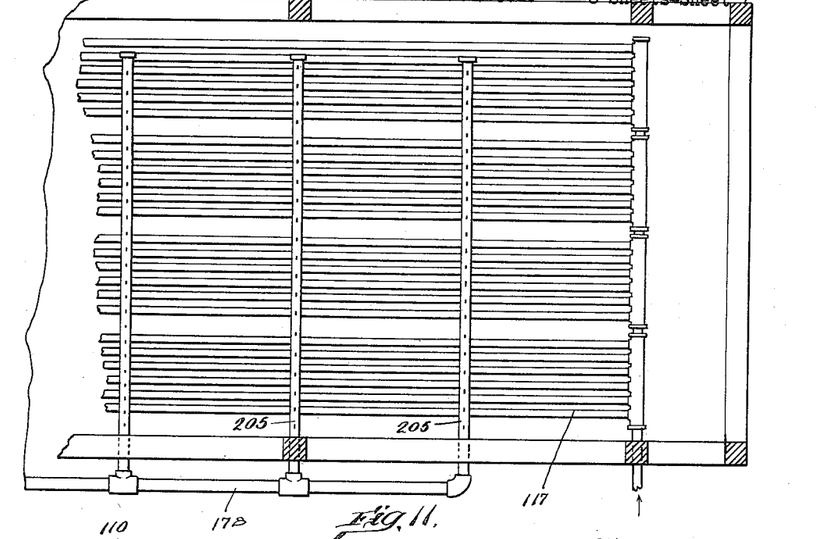
Fig. 11 is a partial sectional plan view of the drying chamber along lines 11—11 of Fig. 9 showing air heating coils and dry air distribution pipes.
Figure 12:
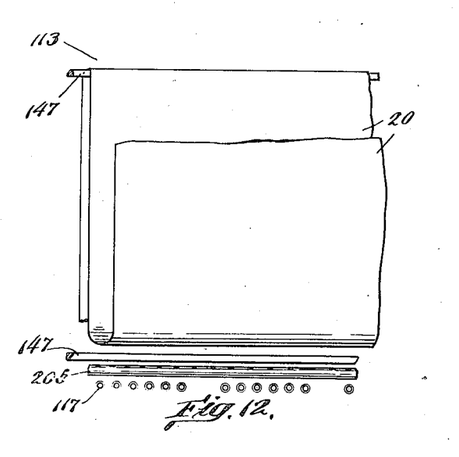
Fig. 12 is a detail, in transverse sectional elevation, of the drying chamber of Fig. 9.

The cold and dry air is now directed through the heat exchangers where its temperature is raised in lowering the temperature of the moist air and passes through the pipe 178 to the bottom of the loop chamber 113 in which it is uniformly distributed by the plurality of perforated distributing pipes 205 placed therein over the heating coils 117.

The term "fold" is herein used generically to denote the formation of the coated web on the conveyor and is intended to include the formation assumed by the web in the apparatus illustrated in Figs. 1 through 8, and also the formation assumed by the web in the apparatus illustrated in Figs. 9 through 15, and includes both "loops" and "festoons" although "loops" and "festoons" are herein used specifically to denote the formation of the web in the apparatus illustrated in Figs. 9 through 15.

I claim:—

1. In a drying apparatus for material in the web, the combination of a U-shaped horizontally arranged drying chamber through which the wet coated web is passed, means for moving the web through said drying chamber and means to supply a drying gas to the lower section of the drying chamber and move it through the drying chamber in proximity to the web in a direction contrary to the movement of the web to be dried.

2. In a drying apparatus for material in the web, the combination of a supporting shaft for a roll of the material, a U-shaped horizontally arranged drying chamber through which the wet coated web is passed having an entrance slot and an exit slot at the same end thereof, adjacent the coating device, and means to support and permit continuous movement of the web between the exit slot and the coating device, whereby the web in the form of an endless section is permitted to pass continuously through the drying chamber, means for winding the coated and dried web and means to supply a drying gas to the lower section of the drying chamber and move it through the drying chamber in proximity to the web in a direction contrary to the movement of the web to be dried, substantially as described.

3. In a drying apparatus for material in the web, the combination of a supporting shaft for a roll of the material, a drying chamber through which the wet coated web is passed having an upper compartment formed with an entrance slot and a lower compartment formed with an exit slot, said upper compartment having a smaller cross-section than the lower compartment, and means to support the web and permit continuous movement thereof between the exit slot and the entrance slot and again to the drying chamber, whereby the web in the form of an endless section is permitted to pass continuously through the drying chamber, a winding shaft, and means to move the web, substantially as described.

4. In a drying apparatus for material in the web, the combination of a supporting shaft for a roll of the material, a drying chamber through which the web is passed after receiving the coating from the coating device having an upper compartment formed with an entrance slot and a lower compartment formed with an exit slot, said upper compartment having a smaller cross-section than the lower compartment, and means to support the web and permit continuous movement thereof between the exit slot and the coating device and again to the drying chamber, whereby the web in the form of an endless section is permitted to pass continuously through the drying chamber, means for winding the coiled and dried web, tension rolls to maintain the web under tension before passing through the coating device and thereafter until it reaches the lower compartment, and means to move the web, substantially as described.

5. In a drying apparatus for material in the web, the combination of a U-shaped horizontally arranged drying chamber through which the web is passed having an entrance slot for the wet coated web and an exit slot for the dry web at the same end thereof, and means to supply a drying gas to the lower section of the drying chamber and move it through the drying chamber in proximity to the web in a direction contrary to the movement of the web to be dried, substantially as described.

6. In a drying apparatus for material in the web, the combination of a U-shaped horizontally arranged drying chamber having an entrance slot and an exit slot, positively driven means arranged at the bend of said chamber operable to draw the web through a coating device and into and along the upper portion of said chamber, and positively driven means operable to convey the web along the lower portion thereof to the exit slot, and means to supply a drying gas in proximity to the web in a direction contrary to the movement of the web to be dried, substantially as described.

7. In a drying apparatus for material in the web, the combination of a U-shaped horizontally arranged drying chamber having an entrance slot and an exit slot, positively driven means arranged at the bend of said chamber operable to draw the web through a coating device and into and along the upper portion of said chamber, and positively driven means operable to convey the web along the lower portion thereof to the exit slot, a guiding and supporting means for the web arranged between the exit slot and the coating device, and means to supply a drying gas to the lower section of the drying chamber and move it through the drying chamber in proximity to the web in a direction contrary to the movement of the web to be dried, substantially as described.

8. In a drying apparatus for material in the web, the combination of a U-shaped horizontally arranged drying chamber having an entrance slot and an exit slot, positively driven means arranged at the bend of said chamber operable to draw the web through a coating device and into and along the upper portion of said chamber, and positively driven means operable to convey the web along the lower portion thereof to the exit slot, a guiding and supporting means for the web arranged externally of said chamber adjacent the exit slot, including a tension roll over which the web passes, and means to supply a drying gas to the lower section of the drying chamber and move it through the drying chamber in proximity to the web in a direction contrary to the movement of the web to be dried, substantially as described.

9. In a drying apparatus for material in the web, the combination of a drying chamber having an entrance slot and an exit slot, positively driven drawing means for drawing the wet coated web into and along a portion of said chamber, and positively driven conveying means arranged to receive the web from the drawing means in the form of folds and convey it in folded form to the exit slot, guiding and supporting means for the web disposed externally of the chamber and arranged to pass the web between the exit and entrance slots thereof, winding means for the web arranged in front of said exit slot, and means to move a drying gas through the drying chamber in proximity to the web in a direction contrary to the movement of the web to be dried.

10. In a drying apparatus for material in the web, the combination of a drying chamber having an entrance slot and an exit slot, positively driven drawing means operable at a predetermined rate of speed for drawing the web into and along a portion of the chamber, positively driven conveying means operable at a slower rate of speed to receive the wet coated web from the drawing means in the form of folds and convey it along in folded form to the exit slot, a guiding and supporting means for the web disposed externally of the chamber and arranged to pass the web between the exit and entrance slots thereof, whereby the web in the form of an endless section is permitted to pass continuously through the drying chamber a plurality of times, means to drive a drying gas as air through the drying chamber in proximity to the web in a direction contrary to the movement of the web to be dried, and in series means for receiving the current from the drying chamber after passing through the same and directing the same again through the drying chamber including a condenser for condensing the moisture from the drying medium and a retractor for reheating the drying medium, substantially as described.

11. In a drying apparatus for material in the web, the combination of a U-shaped horizontally arranged drying chamber having an entrance slot and an exit slot, positively driven means arranged at the inner end of said chamber to draw the web thereinto and along the upper portion thereof, positively driven means arranged in and coextensive with the lower portion thereof to convey the web along said lower portion to the exit slot, and means to supply a drying gas to the lower section of the drying chamber and move it through the drying chamber in proximity to the web in a direction contrary to the movement of the web to to be dried, sdbstantially as described.

12. In a drying apparatus for material in the web, the combination of a U-shaped horizontally arranged drying chamber having an entrance slot and an exit slot, positively driven means arranged at the inner end of said chamber operable at a predetermined rate of speed to draw the web through a coating device and into and along the upper portion of said chamber, positively driven means arranged in and coextensive with the lower portion thereof, and operable at a slower rate of speed than the aforesaid means to receive the web from the aforesaid means, and permit it to fold thereupon and to convey it in folded form along said lower portion to the exit slot, and means to supply a drying gas to the lower section of the drying chamber and move it through the drying chamber in proximity to the web in a direction contrary to the movement of the web to be dried, substantially as described.

13. In a drying apparatus for material in the web, the combination of a U-shaped horizontally arranged drying chamber having an entrance slot and an exit slot, positively driven means arranged at the inner end of said chamber operable at a predetermined rate of speed to draw the web through a coating device and into and along the upper portion of said chamber, positively driven means arranged in and coextensive with the lower portion thereof, and operable at a slower rate of speed than the aforesaid means to receive the web from the aforesaid means, and permit it to fold thereupon and to convey it in folded form along said lower portion to the exit slot, guiding and supporting means for the web between the exit slot and the coating device, and means to supply a drying gas to the lower section of the drying chamber and move it through the drying chamber in proximity to the web in a direction contrary to the movement of the web to be dried, substantially as described.

14. In a drying apparatus for material in the web, the combination of a U-shaped horizontally arranged drying chamber having an entrance slot and an exit slot, positively driven means arranged at the inner end of said chamber operable at a predetermined rate of speed to draw the web through a coating device and into and along the upper portion of said chamber thereof, positively driven means arranged in and coextensive with the lower portion thereof, and operable at a slower rate of speed than the aforesaid means to receive the web from the aforesaid means, and permit it to fold thereupon and to convey it in folded form along said lower portion to the exit slot, guiding and supporting means for the web between the exit slot and the coating device including a tension roll over which the web is drawn, and means to supply a drying gas to the lower section of the drying chamber and move it through the drying chamber in proximity to the web in a direction contrary to the movement of the web to be dried, substantially as described.

15. In a drying apparatus for material in the web, the combination of a U-shaped horizontally arranged drying chamber having an entrance slot and an exit slot, a positively driven drawing roll arranged at the inner end of said chamber to draw the web thereinto and along the upper portion thereof, positively driven means arranged in and coextensive with the end and lower portion of said drying chamber to receive the web and convey it along the lower portion to the exit slot, and means to supply a drying gas to the lower section of the drying chamber and move it through the drying chamber in proximity to the web in a direction contrary to the movement of the web to be dried, substantially as described.

16. In a drying apparatus for material in the web, the combination of a U-shaped horizontally arranged drying chamber having an entrance slot and an exit slot, positively driven means arranged at the inner end of said chamber to draw the web thereinto and along the upper portion thereof, a plurality of belts arranged in and extended lengthwise the lower portion thereof to receive the web in folds from the aforesaid means and convey it along the lower portion thereof in folded form to the exit slot, and means to supply a drying gas to the lower section of the drying chamber and move it through the drying chamber in proximity to the web in a direction contrary to the movement of the web to be dried, substantially as described.

17. In a drying apparatus for material in the web, the combination of a U-shaped horizontally arranged drying chamber having an entrance slot and an exit slot, positively driven means arranged in the inner end of said chamber to draw the web thereinto and along the upper portion thereof, positively driven means arranged in and coextensive with the end and lower portion of said drying chamber to receive the web in folded form and convey it along said lower portion to the exit slot, means to convey the web from the first named positively driven means to supply a drying gas to the lower section of the drying chamber and move it through the driving chamber in proximity to the web in a direction contrary to the movement of the web to be dried, substantially as described.

18. A drying and solvent recovering device for a web having a wet coating containing a volatile solvent, comprising drawing and supporting devices for moving the wet coated web continuously under tension unfolded from a tension device through a coating device to guiding devices, guiding devices for directing the web to a conveyor, a conveyor arranged to receive the web from the guiding devices and arranged to travel much more slowly than the web and return the web to the supply end of the machine for another coating or for withdrawal, a drying chamber enclosing the web for a part of its return traverse and means for passing a current of a drying gas in a direction contrary to the movement of the web through said drying chamber and through condensing and reheating means exterior to the chamber and thence again through the drying chamber and heating means in said drying chamber for maintaining the gas in said drying chamber at the desired temperature.

19. In a drying apparatus for material in the web, the combination of a drying chamber divided into a plurality of superimposed compartments, each compartment connected at the end thereof with the succeeding compartment, means to pass the wet coated web downward through said compartments and means to pass a drying medium upward through said compartments at a speed greater in the highest compartment than in any other compartment.

20. In a drying apparatus for material in the web, the combination of a drying chamber divided into a plurality of superimposed compartments, each compartment connected at the end thereof with the succeeding compartment, means to pass the wet coated web downward through said compartments and means to pass a drying medium upward through said compartments at a speed greater in the highest compartment than in any other compartment, said compartments being of differing temperatures.

21. In a drying apparatus for material in the web, a drying chamber divided into a plurality of superimposed, connected compartments through which the coated web is adapted to pass, means for passing the web under tension through one of said compartments, and a conveyor for passing a slack web through another of said compartments, and means to pass a drying medium through said compartments at a greater speed in the higher compartment than in any other compartment.

22. In a drying apparatus for material in the web, a drying chamber divided into a plurality of superimposed, connected compartments through which the coated web is adapted to pass, means for passing the web under tension through certain of said compartments, and a conveyor for passing a slack web through another of said compartments, and means to vary the speed of movement of said conveyor.

23. In drying apparatus for material in the web, the combination of a drying chamber through which the wet coated web is adapted to pass, means to circulate a drying medium through the chamber over the wet coated web, a condenser through which the moist drying medium is passed to cool the drying medium and condensed moisture therefrom, and a mechanical separator through which the cold drying medium is passed to further extract moisture therefrom.

24. In drying apparatus for material in the web, the combination of a drying chamber through which the wet coated web is adapted to pass, means to circulate a drying medium through the chamber over the wet coated web to abstract moisture therefrom, a condenser through which the moist drying medium is passed to be cooled and the moisture therein condensed, and baffle plates arranged in the path of said cooled drying medium in the condenser to further separate moisture therefrom.

25. In drying apparatus for material in the web, a drying chamber through which the coated web is adapted to be passed to be dried, a movable conveyor disposed in the drying chamber arranged to receive a portion of the web in folded form, and means to vary the speed of movement of said conveyor.

26. In drying apparatus for material in the web, a drying chamber through which the coated web is adapted to be passed to be dried, and means to pass a drying medium over successive portions of the web at differing velocities and in a direction contrary to the movement of the web.

27. In a drying apparatus for material in the web, a drying chamber divided into a plurality of connected compartments through which the coated web is passed to be dried, means to circulate a drying medium through said compartments in a direction contrary to the movement of the web, certain of said compartments being of less cross-section than other of said compartments whereby the velocity of the drying medium through said compartments is greater than through said other compartments.

28. In a drying apparatus for material in the web, the combination of a drying chamber having horizontally-arranged, vertically-spaced upper and lower compartments, means to move the wet coated web through the upper and thence through the lower compartment and means to supply a drying medium to the lower compartment and move it upwardly through the drying chamber in proximity to the web in a direction contrary to the movement of the web to be dried, substantially as described.

In testimony whereof, I have signed my name to this specification.

PAUL S. SMITH.